(12) United States Patent
Liehr et al.

(10) Patent No.: US 10,027,109 B2
(45) Date of Patent: Jul. 17, 2018

(54) THERMAL PROTECTION CIRCUIT (71) Applicant: Thermik Geraetebau GmbH, Sondershausen (DE)

(72) Inventors: Hans-Christian Liehr, Sangerhausen (DE); Marcel P. Hofsaess, Sondershausen (DE)

(73) Assignee: THERMIK GERAETEBAU GMBH, Sondershausen (DE)

( * ) Notice: Subject to any disclaimer, the term of this patent is extended or adjusted under 35 U.S.C. 154(b) by 432 days.

(21) Appl. No.: 14/734,606

(22) Filed: Jun. 9, 2015

(65) Prior Publication Data

US 2015/0270698 A1    Sep. 24, 2015

Related U.S. Application Data (63) Continuation of application No. PCT/EP2013/076026, filed on Dec. 10, 2013.

(30) Foreign Application Priority Data

Dec. 18, 2012  (DE) .................. 10 2012 112 487
Feb. 5, 2013   (DE) .................. 20 2013 100 509 U
May 14, 2013   (DE) .................. 20 2013 102 091 U (51) Int. Cl.
*H02H 5/04*    (2006.01)
*H01H 9/54*    (2006.01)
*H01H 37/00*   (2006.01)
*H01H 37/54*   (2006.01)

(52) U.S. Cl.
CPC ............ *H02H 5/047* (2013.01); *H01H 9/541* (2013.01); *H01H 37/002* (2013.01); *H01H 37/5418* (2013.01); *H01H 37/5427* (2013.01); *H02H 5/04* (2013.01); *H01H 2037/5463* (2013.01)

(58) Field of Classification Search
CPC ...... H01H 37/002; H01H 37/54; H01H 9/541; H02H 5/04; H02H 5/047
See application file for complete search history.

(56) References Cited

U.S. PATENT DOCUMENTS 3,539,775 A   11/1970   Casson
3,549,970 A   12/1970   Lewus
(Continued)

FOREIGN PATENT DOCUMENTS

CN   101710548 A   5/2010
CN   102693869 A   9/2012
(Continued)

OTHER PUBLICATIONS

English language translation of International Search Report on Patentability (Chapter II) for PCT/EP2013/076026; dated Jun. 18, 2015; 16 pp.
(Continued)

*Primary Examiner* — Thienvu Tran
*Assistant Examiner* — Christopher Clark
(74) *Attorney, Agent, or Firm* — Harness, Dickey & Pierce, P.L.C.

(57) ABSTRACT

In a thermal protection circuit with two electrical connection terminals for an electrical device to be protected from overheating and at least one temperature-dependent switch, at least one electronic semiconductor switch for DC voltage is arranged.

19 Claims, 6 Drawing Sheets

(56) References Cited

U.S. PATENT DOCUMENTS

| | | | |
|---|---|---|---|
| 3,600,635 A * | 8/1971 | Neilson | H02H 3/085 |
| | | | 307/39 |
| 4,574,229 A | 3/1986 | Kim | |
| 5,905,620 A | 5/1999 | Becher et al. | |
| 6,249,211 B1 * | 6/2001 | Hofsaess | H01H 1/504 |
| | | | 337/333 |
| 9,263,879 B2 * | 2/2016 | Liehr | H01H 37/002 |
| 2007/0252671 A1 | 11/2007 | Bischoff et al. | |
| 2012/0086540 A1 * | 4/2012 | Duval | H01C 7/126 |
| | | | 337/1 |
| 2013/0271258 A1 | 10/2013 | Hofsaess et al. | |

FOREIGN PATENT DOCUMENTS

| | | |
|---|---|---|
| DE | 1 951 031 | 4/1970 |
| DE | 2 032 633 | 2/1971 |
| DE | 21 21 802 | 1/1973 |
| DE | 2 253 975 | 5/1973 |
| DE | 26 44 411 C2 | 4/1978 |
| DE | 31 32 338 A1 | 3/1983 |
| DE | 198 27 113 C2 | 12/1999 |
| DE | 10 2004 036 117 A1 | 3/2006 |
| DE | 10 2007 042 903 A1 | 1/2009 |
| DE | 20 2013 100 509 U1 | 4/2011 |
| DE | 10 2011 016 142 A1 | 9/2012 |
| DE | 10 2011 100 752 A1 | 11/2012 |
| DE | 10 2012 103 306 B3 | 4/2013 |
| EP | 0 072 566 A2 | 2/1983 |
| GB | 331372 | 7/1930 |
| GB | 1 394 612 | 5/1975 |
| GB | 2 458 650 A | 9/2009 |
| JP | 1-303018 | 12/1989 |
| JP | 7-153499 | 6/1995 |
| JP | 2002-352685 | 12/2002 |
| WO | WO 95/00962 | 1/1995 |

OTHER PUBLICATIONS

International Search Report for PCT/EP2013/076026; dated Mar. 27, 2014; 3 pp.

Chinese Office Action for Appl'n No. 201380072925.0, with English language translation; dated Aug. 26, 2016; 15 pp.

Chinese Office Action for Appl'n No. 201310689501.1, with English language translation; dated Sep. 8, 2016; 17 pp.

German language Examination Report for Application No. 10 2012 112 487.6; dated Dec 7, 2016; 6 pp.

* cited by examiner

THERMAL PROTECTION CIRCUIT

CROSS-REFERENCES OF RELATED APPLICATIONS

This is a continuation application of co-pending international patent application PCT/EP 2013/076026, filed Dec. 10, 2013 and designating the United States, which was published in German as WO 2014/0954477 A1, and claims priority to German patent application DE 10 2012 112 487, filed Dec. 18, 2012, German utility model application 20 2013 100 509, filed Feb. 5, 2013, and German utility model application 20 2013 102 091, filed May 14, 2013, which are incorporated herein by reference.

BACKGROUND OF THE INVENTION

The present invention relates to a thermal protection circuit comprising two electrical connection terminals for an electrical device to be protected against overheating, comprising at least one temperature-dependent switch, which temperature dependent switch in one embodiment comprises a temperature-dependent switching mechanism, two stationary contacts which are connected to the connection terminals, and a current transfer element, which current transfer element is arranged on the switching mechanism, is moved by the switching mechanism and comprises two counter contacts, which counter contacts are electrically connected to one another, are in temperature-dependent bearing contact with the two stationary contacts and thereby connect said stationary contacts electrically conductively to one another.

A temperature-dependent switch which can be used in the thermal protection circuit is known from DE 26 44 411 C2.

The known switch has a housing with a cup-like lower part, into which a temperature-dependent switching mechanism is inserted. The lower part is closed by an upper part, which is held on the lower part by the upstanding rim of the lower part. The lower part can be manufactured from metal or insulating material, while the upper part consists of insulating material.

Two contact rivets, whose inner heads act as stationary contacts for the switching mechanism, rest in the upper part. The rivet shafts protrude outwards through through-openings in the upper part and merge there with outer heads, which are used for the external terminal connection of the known switch. Connecting lead wires can be soldered directly to these outer heads, wherein it is also known to hold angular contacts on the outer heads, to which angular contacts connecting lead wires are soldered or crimped.

The switching mechanism bears a current transfer element in the form of a contact bridge, two counter contacts being provided on the upper side of said contact bridge, which counter contacts are electrically connected to one another via the contact bridge, are brought into bearing contact with the two stationary contacts, depending on the temperature, and then electrically connect said stationary contacts to one another.

The temperature-dependent switching mechanism has a bimetallic snap-action disc and a spring snap-action disc, through which discs a pin passes centrally which bears the contact bridge. The spring snap-action disc is fixed circumferentially in the housing, while the bimetallic snap-action disc is supported on a shoulder of the lower part or on the rim of the spring snap-action disc, depending on the temperature, and in the process either enables the bearing contact of the contact bridge on the two stationary contacts or else lifts the contact bridge off from the stationary contacts, with the result that the electrical connection between the external terminals is interrupted.

This temperature-dependent switch is used in a known manner to protect electrical devices from overheating. For this, the switch is connected electrically in series with the device to be protected and the supply voltage thereof and is arranged mechanically on the device in such a way that it is in thermal contact therewith.

Below the response temperature of the bimetallic snap-action disc, the contact bridge bears against the two stationary contacts, with the result that the circuit is closed and the load current of the device to be protected flows via the switch. If the temperature increases beyond a permissible value, the bimetallic snap-action disc lifts off the contact bridge from the stationary contacts, counter to the actuating force of the spring snap-action disc, as a result of which the switch is opened and the load current of the device to be protected is interrupted.

The now de-energized device can then cool down again. In the process, the switch which is thermally coupled to the device also cools down again and then automatically closes again.

Owing to the dimensioning of the contact bridge, the known switch is capable of conducting much higher operating currents in comparison with other temperature-dependent switches in which the load current of the device to be protected flows directly via the bimetallic snap-action disc or a spring snap-action disc associated therewith, with the result that said switch can be used for protecting larger electrical devices with a high power consumption.

As already mentioned, the known switch automatically switches on again after cooling down of the device protected thereby. While such a switching response can be entirely expedient for protecting a hairdryer, for example, overall this is not desirable where the device to be protected should not automatically switch on again once it has been switched off in order to avoid damage. This applies, for example, to electric motors which are used as drive assemblies.

DE 198 27 113 C2 therefore proposes providing a so-called self-holding resistor, which is electrically in parallel with the external terminals. The self-holding resistor is electrically in series with the device to be protected when the switch is open, with now only a nonhazardous residual current flowing through said device owing to the resistance value of the self-holding resistor. This residual current is sufficient, however, for heating the self-holding resistor to such an extent that it emits heat which keeps the bimetallic snap-action disc above its switching temperature.

The switch known from DE 198 27 113 C2 can also be equipped with a current-dependent switching function, for which purpose a heating resistor is provided, which is connected permanently in series with the external terminals. The load current of the device to be protected therefore flows constantly through this heating resistor, which can be dimensioned such that, when a specific load current intensity is exceeded, it ensures that the bimetallic snap-action disc is heated to a temperature above its response temperature, with the result that the switch already opens in the event of an increased load current before the device to be protected has been heated to an impermissible extent.

Such switches have proven reliable for everyday use. They are used in particular for the protection of electrical devices with a high power consumption because they can conduct high currents via the contact bridge. When such switches are operated with AC supply voltages and do not open at the zero crossing of the AC supply voltage, arcs form between the stationary contacts and the counter contacts in the event of the contact bridge being lifted off from the stationary contacts, and the voltage drop across the switch is reduced to the arc voltage. The voltage drop remains at this level until the applied AC supply voltage changes polarity, i.e. reaches its next zero crossing. Then, the arcs are quenched and the switch is reliably opened.

In the conventional application cases of the known switch with a high switching power, a load current with a high current intensity needs to be interrupted, which means that strong arcs form which in turn results in contact erosion and therefore, as a consequence, long term in a change in the geometry of the switching areas and often also in impairment of the switching response.

In the case of uncontrolled flashover in the interior of the switch, arcs can even cause damage to the bimetallic snap-action disc. In addition, arcs can result in the switching areas on the stationary contacts and the counter contacts sticking together, so to speak, and the contact bridge not detaching or no longer detaching quickly enough from the stationary contacts.

These problems are increased with the number of switching cycles even more, with the result that the switching response of the known switch is impaired over the course of time. Against this background, the life period, i.e. the number of permissible switching cycles of the known switches, is limited, wherein the life period is also dependent on the switching power, i.e. the current intensity of the switched currents.

Switches of the generic type by the applicant have, for example, on an AC supply voltage of 250 volts a conventional life of 10,000 switching cycles given a load current of 10 amperes and 2000 switching cycles given a load current of 25 amperes.

If, to the contrary, the known switches are operated with a DC supply voltage, the forming arcs as a rule are not quenched because the DC supply voltages do not have zero crossings that lead to arc quenching with an AC supply voltage.

Quenching of arcs does not occur in situations whenever the DC supply voltage drop over an open switch is so high that it lies in the region of minimal arc drop voltage which above all is determined by the construction of the switch.

For temperature-dependent switches used in DC voltage circuits it must therefore be ensured that arcs do not develop at all.

When the know switches are used in DC voltages circuits, attention is paid to the fact that the voltage drop over an open switch lies below the arc drop voltage as determined by construction. This requires in certain applications to use temperature-dependent switches that in the open state ensure a respectively large distance between the contact bridge and the stationary contacts and thus show large dimensions.

Further, provisions have to made for quick switching behavior, meaning a quick movement of the contact bridge from its closed position into its open position where it has its maximum distance to the stationary contacts. Thereby, the minimal arc drop voltage can also be increased. However, this quick switching requires correspondingly designed spring and/or bimetallic snap-action discs which is also cost intensive and leads to larger dimensions.

However, large dimensions are frequently undesired because this renders the construction of switches complex and cost intensive and requires an undesirable large installation space.

Known temperature-dependent switches with desired small dimensions on the other hand side only have a low maximal permissible DC switching voltage which is determined by the minimal arc drop voltage determined by construction.

In connection with relays and contactors, it is known that arcs can be influenced by alternating electromagnetic fields and can be quenched by capacitive and inductive components in the AC circuit. Furthermore, it is known to guide an arc occurring in contactors by means of so-called permanent magnet blowout such that the arc is quenched quickly.

Further, DE 31 32 338 A1 discloses connecting a controllable semiconductor valve for AC voltages, for example a triac, in parallel with a contactor comprising two fixed contacts and a linearly moveable contact bridge by virtue of the current terminals of said semiconductor valve being connected to the fixed contacts. The control input of the triac is connected to a terminal at the contact bridge via a series resistor and a flexible line, which leads into the interior of the contactor, which terminal is positioned between the contact points with the fixed contacts.

When the contactor is closed, the voltage drop across the contact points needs to be so low that no effective control current for the triac is formed between the control terminal and its reference terminal, which corresponds to one of the two current terminals. The triac is then open, i.e. remains de-energized.

If the contactor opens as a result of external driving, two arcs are produced which must result in such a high arc voltage for a sufficient time span that the contact bridge to the reference terminal has a sufficient potential difference until a control current flows through the series resistor which can trigger the triac. Once the triac has been triggered, i.e. opened, it takes up the load current flowing through the contactor, whereupon the arcs are quenched.

By virtue of the rapid electromagnetic actuation of the contact bridge, said contact bridge moves sufficiently far away from the fixed contacts so quickly that renewed triggering of the triac cannot take place once the load current has been interrupted at the zero crossing of the AC supply voltage.

This method therefore has three critical conditions. The voltage drop across the contact points should not be too great when the switch is closed and should not be too low for a specific period of time when the switch is open. In addition, the interrupting speed should be so great that the triac is not triggered again. In addition, it is at least problematic in design terms that a flexible line needs to be guided into the interior of the contactor.

DE 22 539 75 A discloses a circuit in which an arc forming during opening or closing of a temperature-dependent switch in an AC voltage circuit is quenched by a triac arranged in parallel with the switch. The temperature-dependent switch used here is a changeover switch having a central terminal, which is connected, in temperature-dependent fashion, to a main contact, which is arranged in the load circuit of the device to be protected, or an auxiliary contact, which is connected to the control input of the triac. When the auxiliary contact is closed, a residual current flows permanently, which results in power losses.

JP H01 303 018 A, GB 2 458 650 A and DE 20 326 33 A each disclose a circuit in which a triac conducting the operating current of an device is triggered or turned off via a temperature-dependent switch in an AC voltage circuit.

DE 20 2013 100 509 U1 of the present application discloses that the principle of arc quenching described in the abovementioned DE 31 32 338 A1 for AC supply voltages can surprisingly also be used in existing temperature-dependent switches. That is to say that if the control input of the semiconductor valve is connected preferably to the switching mechanism of the switch via the lower part and to the counter contacts on the current transfer element via the switching mechanism, in the case of the switch known from DE 26 44 411 C2 it is connected electrically to the contact bridge via the spring snap-action disc and/or the bimetallic snap-action disc and via said contact bridge to the counter contacts. Owing to the fact that in this case the contact bridge itself is electrically conductive, the control input is connected to the two counter contacts provided on said contact bridge and therefore is at the electrical potential of the two counter contacts.

However, the contact bridge itself does not need to be electrically conductive; it is sufficient if the counter contacts provided on said contact bridge are connected electrically to one another and to the switching mechanism, with the result that the switching mechanism is at the potential of the counter contacts.

When the temperature-dependent switch is closed, this potential corresponds to the potential of the AC supply voltage at the reference current terminal of the semiconductor valve, with the result that no control current is produced for the semiconductor valve. If the temperature-dependent switch opens, arcs begin to form when the contact bridge is lifted off from the stationary contacts, and these arcs rapidly reach an arc voltage of 10 volts. As a result, a sufficiently high and long-lasting control current is produced for the semiconductor valve, which results in triggering of the semiconductor valve, which then opens.

As soon as the semiconductor valve is triggered, it takes up the load current and the temperature-dependent switch becomes de-energized, with the result that the arcs are quenched. The semiconductor valve closes again when the AC operating voltage reaches the zero crossing. During this time span, the contact bridge has moved so far away from the stationary contacts that flashover and renewed formation of arcs do not occur.

Thus, the idea in DE 20 2013 100 509 U1 resides in accepting the formation of arcs and to quench the arcs by the AC switching behavior of a triac before the AC supply voltage reaches its next zero crossing where the arc will be quenched anyway. By this, the life period and/or the switching power of the temperature-dependent switch are increased.

SUMMARY OF THE INVENTION

Against this background, it is an object of the present invention to increase, in the thermal protection circuit mentioned at the outset, the maximum permissible DC switching voltage of the temperature-dependent switch in a manner which is inexpensive and simple in design terms.

In accordance with the invention, this object is achieved with the thermal protection circuit mentioned at the outset by the fact that said thermal protection circuit comprises at least one electronic semiconductor switch for DC voltage in order to quench arcs produced in the temperature-dependent switch. The temperature-dependent switch preferably comprises two electrical terminals and one control input, wherein each of the two electrical terminals is connected to one of the connection terminals, and the control input is electrically connected, preferably via a series resistor, to the mating contacts on the current transfer element via the switching mechanism at least when the temperature-dependent switch is closed.

Now, the inventors of the present application have found that by external wiring to an electronic semiconductor switch the maximal permissible DC switching voltage of an existing temperature-dependent switch can be increased, without any constructional changes at the switch being necessary.

According to the present application and contrary to the teaching in the prior art, the inventive idea resides in accepting the formation of arcs—due to increased DC switching voltage—in a temperature-dependent switch inserted into a DC voltage circuit, but to quench the forming arcs by means of an electronic semiconductor switch.

In this case, it is advantageous in design terms that no moveable cable needs to be guided into the interior of the switch to the current transfer element, but that, in unexpected fashion, the temperature-dependent switching mechanism can produce the electrical connection between the control input of the semiconductor switch and the counter contacts on the current transfer element.

By virtue of the use according to the invention of an electronic semiconductor switch, surprisingly the arcs forming due to a high DC switching voltage are quenched so quickly that they do not produce any damages in the interior of the switch and that the life period of the switch is not reduced.

During opening of the switch, initially such a high DC voltage drop establishes over the switch that arcs form between the contact bridge and the stationary contacts. These arcs connect the semiconductor switch conductive, such that the temperature-dependent switch is short-circuited and becomes de-energized. Thereby, the arcs are quenched.

In this manner, DC voltages far beyond the arc drop voltage can be safely switched off according to the invention when using existing switches.

Thus, existing temperature-dependent switches of the type described at the outset can be used without any design changes for higher switching powers than in a thermal protection circuit without an arc-quenching semiconductor switch.

These existing switches have, in one configuration, a spring snap-action disc, which can be manufactured from a bimetallic part, and bears the current transfer element and is connected permanently mechanically and electrically to the lower part. In this case, the electrically conductive current transfer element is therefore connected permanently to the control input of the semiconductor switch.

However, designs with a bimetallic and spring snap-action disc are also known in which the spring snap-action disc is no longer electrically connected to the lower part at least after complete opening of the switch because it changes from its convex shape to its concave shape. At the beginning of the opening operation, the spring snap-action disc does, however, push with its rim further inwards on the lower part, while the bimetallic snap-action disc already begins to lift off the current transfer element from the stationary contacts, counter to the force of the spring snap-action disc which is gradually pressed flat in the process, with the result that the arcs form.

Only when the bimetallic snap-action disc has pressed the spring snap-action disc sufficiently flat does the spring snap-action disc snap over. Up to this point in time, however, it is electrically connected to the lower part, with the result that the control current can pass to the control input. Surprisingly, the time period up to this point in time is sufficient for switching the semiconductor switch conductive and quenching the arc.

For the use according to the invention of the semiconductor switch for quenching arcs produced in DC voltage circuits in temperature-dependent switches, it is therefore not necessary for the control input to be connected permanently electrically to the switching mechanism. It is merely important that this connection exists, at least when the switch is closed and thereafter, until the semiconductor switch closes and quenches the arcs.

The inventors of the present application have for the first time identified that certain existing temperature-dependent switches provide an electrical connection between the counter contacts on the current transfer element and the lower part which is maintained at the beginning of an opening operation at least for a length of time sufficient for a semiconductor switch to be capable of being closed by arcs forming.

For this, the semiconductor switch merely needs to be connected in parallel with the feed lines to the temperature-dependent switch at a suitable point. In addition, only a control line from the control input to the switching mechanism is further required. The semiconductor switch can in this case be fitted wherever there is corresponding installation space available. In addition, the installation space can be selected such that the semiconductor switch is not arranged in the interior of coil windings, but wherever relatively low temperatures prevail which do not impair the function of the semiconductor switch.

The semiconductor switch therefore does not need to be arranged directly on the device. Therefore, it can also be installed on the device, for example via a plug, only when the temperature-dependent switch is installed on the device and the device has been impregnated, which is advantageous in particular in the case of electric motors and coils.

With this measure, it is advantageous, for example, for the semiconductor switch to be capable of being retrofitted and/or replaced at any time.

Therefore, the present invention also relates to an electrical device which is provided with the novel thermal protection circuit, wherein the semiconductor switch is preferably connected to the or each temperature-dependent switch in detachable fashion, preferably via a plug, The present invention now also for the first time makes it possible to use temperature-dependent switches with a simple design which are therefore inexpensive for switching powers for which they are not suited without the additional semiconductor switch.

Thereby, for the first time temperature-dependent switches can be reliably used for high DC switching voltages, which as current transfer element do not comprise a contact plate but a spring part that carries both counter contacts or at which both counter contacts are embodied. The spring part can be a bimetallic part, especially a bimetallic snap-action disc, which not only provides the temperature-dependent switching function but simultaneously also conducts the current when the switch is closed.

Because according to the invention the arcs forming on opening of the switch at the two counter contacts are very quickly quenched again by the semiconductor switch, the bimetallic disc is not or only so slightly damaged upon opening of the switch, that as compared to usage without semiconductor switch the life period and above all the permissible switching power of these temperature-dependent switches of very simple construction is remarkably increased.

Thus, the inventors have not taken the path previously taken in the prior art, namely that of further optimizing the design of the known switches in respect of higher minimal arc drop voltage, but have selected the path which at first glance is unconventional and also does not promise success, namely that of additionally using a semiconductor switch, although this in addition also results in additional costs.

The additional costs are, however, according to the knowledge of the inventors, more than absorbed by virtue of the fact that not only existing switches, contrary to expectations, can now be used for higher switching powers, but also that the life period of existing temperature-dependent switches is increased.

The inventors have therefore provided a circuit which effects electronic arc quenching for temperature-dependent switches with a bimetallic switching mechanism in DC voltage circuits.

The object on underlying the invention is thus completely achieved.

An "electronic semiconductor switch for DC voltage" in the context of the present invention is understood as meaning a semiconductor component which—without a control signal at its control input—blocks a DC voltage applied to its current terminals and switches on, i.e. is turned conductive, when a control voltage is applied.

A thermal protection circuit according to the invention is connected into the DC supply circuit of an electrical device to be protected from overheating, wherein the semiconductor switch and at least one temperature-dependent switch are interconnected between the two connection terminals.

In one embodiment, two semiconductor switches are provided, the control inputs whereof, preferably each via a series resistor, are electrically connected via the switch to the counter contacts, at least when the temperature-dependent switch is closed, wherein each semiconductor switch comprises a first and a second current terminal, the first current terminal of one of the semiconductor switches being connected to the first current terminal of the other semiconductor switch, and the second current terminal of one of the semiconductor switches and the second current terminal of the other semiconductor switch are connected with one of the connection terminals.

By this, the semiconductor switches are anti-connected in series, such that one of the semiconductor switches effects arc quenching in one polarity of the DC supply voltage, and the other semiconductor switches effects arc quenching in the opposite polarity of the DC supply voltage.

In this manner, the thermal protection circuits are designed unipolar, such that upon switching-off of a DC supply voltage the forming arcs are reliably quenched, irrespective of the polarity of the DC supply voltage.

An embodiment of the semiconductor switch used according to the invention are transistor, especially selected from the group comprising bipolar transistors, field-effect transistors (FET), metal-oxide semiconductor field-effect transistors (MOS-FET), especially of the self-locking type.

In this case, it is preferred if the temperature-dependent switching mechanism comprises a spring part, which bears the current transfer element and is electrically conductively connected thereto and is electrically connected to the control input at least when the temperature-dependent switch is closed.

Preferably, the switch has a housing, which accommodates the switching mechanism and has a lower part and an upper part, with the stationary contacts being arranged on the inner side of said upper part.

The spring part can be an elongate bimetallic arm or a spring arm which bears, at its free end, the current transfer element and, at its other end, is fixed to the housing and is formed with a terminal there for the control input. If the spring part is a spring arm, a bimetallic part is associated therewith, which bimetallic part moves the free end of the spring arm away from the stationary contacts in temperature-dependent fashion so that the switch opens. In these embodiments, the control input is permanently connected to the temperature-dependent switching mechanism.

However, the spring part is preferably a bimetallic snap-action disc, which bears the current transfer element centrally and is supported on the lower part at least when the temperature-dependent switch is closed.

Alternatively, the spring part is a spring snap-action disc, which is supported on the lower part at least when the temperature-dependent switch is closed, wherein a bimetallic snap-action disc is provided which lifts off the current transfer element from the stationary contacts above the switching temperature of said bimetallic snap-action disc.

These measures are advantageous in design terms since they use an existing switch as the temperature-dependent switch.

While it is quite sufficient for only a bimetallic snap-action disc to be provided which both produces the contact pressure and ensures temperature-dependent opening, the bimetallic snap-action disc can be relieved of mechanical load in its low-temperature position by a spring snap-action disc, which, in addition to the bimetallic snap-action disc or on its own, effects the contact pressure, which contributes to greater long-term stability of its switching response.

The low current required for switching the semiconductor switch through can be conducted both through the spring snap-action disc and through the bimetallic snap-action disc owing to initial endurance tests at the premises of the applicant.

The lower part can be manufactured from an electrically conductive material or from an insulating material. If the lower part is manufactured from an insulating material, it has an electrode on its base, on which electrode the bimetallic snap-action disc and/or spring snap-action disc is supported and which electrode is passed out of the lower part and is connected there to the control input.

If the lower part itself is electrically conductive, on the other hand, the control input merely needs to be connected to the lower part on the outside, which is advantageous in design terms.

When the spring part is permanently electrically connected to the lower part, it is ensured in a manner which is simple in design terms and inexpensive that arcs produced during an opening operation result in a control current to the control input.

It is further preferred if a self-holding resistor is connected between the stationary contacts, wherein preferably a heating resistor is connected between one of the stationary contacts and the associated connection terminal.

It is advantageous here that self-holding switches and/or switches with a defined current dependency can be used. The inventors of the present application have identified on the basis of tests that, contrary to expectations, a self-holding resistor and/or a heating resistor do/does not impair the use according to the invention of the semiconductor switch.

It is further preferred if the current transfer element is an electrically conductive contact plate, on which the two counter contacts are arranged, which are electrically connected to one another via the contact plate, wherein the contact plate is electrically conductively connected to the switching mechanism.

This measure is likewise advantageous in design terms. The contact plate can have the counter contacts on its upper side, which can be formed by two coated contact areas on the upper side. The upper side of the contact plate can also itself form the counter contacts, or can be formed continuously as a contact area, as is described in DE 10 2011 016 142 A1.

The contact plate can be in the form of a circular contact disc or an elongate contact bridge.

As already mentioned, the current transfer element can also be a spring part, especially a bimetallic snap-action spring at which the counter contacts are provided or embodied, which counter contacts are electrically conductively to each other by the spring part.

The spring part is then preferably permanently connected to the control input of the semiconductor switch. This can be effected via the electrically conductive lower part of the temperature-dependent switch or via an additional support electrode which carries the bimetallic snap-action spring at its center and protrudes out of the housing of the temperature-dependent switch where it is connected to the control input.

Instead of a temperature-dependent switch with two stationary contacts which is in the form of a two-pole normally closed contact, two single-pole temperature-dependent switches can also be used in the thermal protection circuit, with each of these switches having two external terminals. These switches are connected electrically in series via in each case one external terminal, with the result that in each case one further external terminal of a switch acts as connection terminal for the thermal protection circuit. This arrangement is also referred to as a twin arrangement. In this twin circuit, all conventional temperature-dependent switches can be used which are single-pole normally closed contacts.

According to the invention, the current terminals of the semiconductor switch are connected to the two connection terminals, and the control input is connected to the external terminals, which are connected to one another, in order to ensure electronic arc quenching.

If the two temperature-dependent switches open, the arc voltage of the arcs forming results in closing of the semiconductor switch, with the result that the arcs are quenched.

Against this background, the present application also relates to a thermal protection circuit comprising two electrical connection terminals for a device to be protected, comprising two temperature-dependent switches, which each have a temperature-dependent switching mechanism, which produces or opens, in temperature-dependent fashion, an electrical connection between two external terminals, wherein in each case one external terminal of one switch is connected to one of the connection terminals or acts as connection terminal, and the respective other external terminals of the switches are connected to one another, wherein an electronic semiconductor switch comprising two current terminals and a control input is provided, and each of the two current terminals is connected to one of the connection terminals, and the control input is electrically connected to the external terminals, which are connected to one another.

The present application is thus based on the use of an electronic semiconductor switch in a thermal protection circuit comprising two electrical connection terminals for a device to be protected and comprising at least one temperature-dependent switch, in order to electronically quench arcs produced on opening of the switch.

The advantages associated therewith, in addition to the higher switching power and longer life period of the temperature-dependent switches used, also consist in that the semiconductor switch only conducts the load current for a short period of time when the arc is produced, with the result that excessive heating of the semiconductor switch does not occur. Cooling for the semiconductor switch is not required.

During "normal" continuous operation, the load current is conducted through the temperature-dependent switch, which likewise does not require any cooling.

The invention generally provides a thermal protection circuit for an electrical device to be protected from overheating, comprising two connection terminals for the device and at least one temperature-dependent switch and one electronic semiconductor switch.

Further advantages result from the description and the attached drawing.

It goes without saying that the features mentioned above and yet to be explained below can be applied not only in the respectively cited combination, but also in other combinations or on their own, without departing from the scope of the present invention.

BRIEF DESCRIPTION OF THE DRAWINGS

Embodiments of the invention will be illustrated in the attached drawing and are explained in more detail in the description below. In the drawing.

BRIEF DESCRIPTION OF THE PREFERRED EMBODIMENTS

Figure 2:
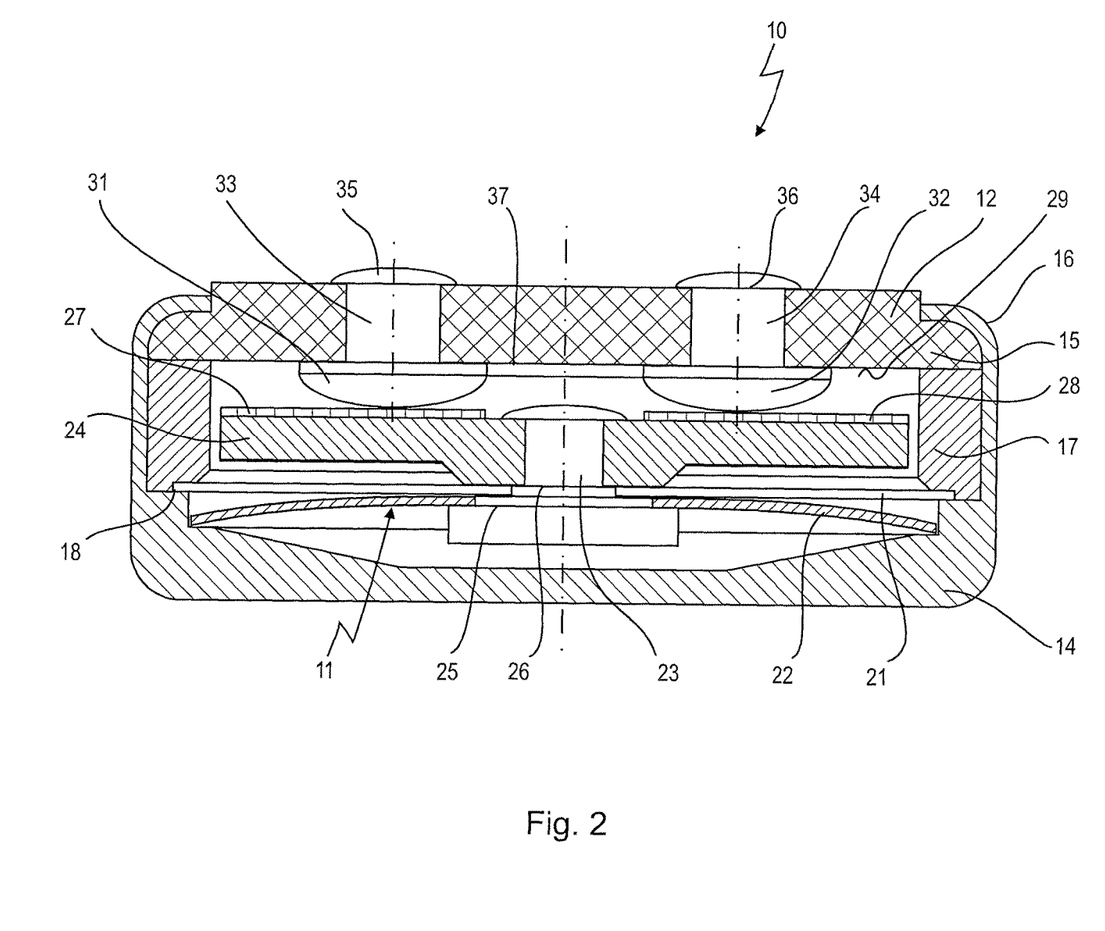
FIG. 2 shows a schematic longitudinal section (not true to scale) through a first embodiment of a temperature-dependent switch, as can be used in the novel thermal protection circuit shown in FIG. 1.

In FIG. 2, 10 denotes a temperature-dependent switch which comprises a temperature-dependent switching mechanism 11 which is accommodated in a housing 12.

The housing 12 comprises a lower part 14 consisting of an electrically conductive material and an upper part 15 consisting of an insulating material, which upper part 15 closes said lower part and is held on said lower part by a flanged rim 16 of the lower part 14. Between the lower part 14 and the upper part 15 a ring 17 is arranged, which ring is supported on a shoulder 18 of the lower part 14 and there clamps in a spring snap-action disc 21 of the switching mechanism 11 at its rim, which spring snap-action disc is therefore permanently electrically conductively connected to the lower part 14.

The switching mechanism 11 comprises, in addition to the spring snap-action disc 21, also a bimetallic snap-action disc 22, which bimetallic snap-action disc together with the spring snap-action disc 21 is centrally passed by a pin-like rivet 23, by means of which rivet said snap-action discs are mechanically and electrically connected to a current transfer element in the form of a contact plate 24 manufactured from an electrically conductive material. The rivet 23 has a first shoulder 25, on which the bimetallic snap-action disc 22 rests with radial and axial play, wherein a second shoulder 26 is provided, on which the spring snap-action disc 21 likewise rests with radial and axial play.

The bimetallic snap-action disc 22 is supported with its peripheral rim on the inside in the lower part 14.

The contact plate 24 has, in the direction of the upper part 15, two large-area counter contacts 27 and 28, which are electrically connected to one another via the contact plate 24 and which interact with two stationary contacts 31, 32 arranged on the inner side 29 of the upper part 15, which stationary contacts are inner heads of contact rivets 33, 34, which pass through the upper part 15 and, with their outer heads, act as external terminals 35, 36.

In the switching position shown in FIG. 2, spring snap-action disc 21 and bimetallic snap-action disc 22 press said contact plate 24 against the stationary contacts 31 and 32, which are thus connected to one another via said counter contacts 27, 28; thus, the switch 10 is closed.

If the temperature of the bimetallic snap-action disc 22 increases beyond its response temperature, its snaps over from the convex shape shown into a concave shape and in the process is supported with its rim in the region of the ring 17 and pulls the contact plate 24 away from the stationary contacts 31, 32 counter to the force of the spring snap-action disc 21; the switch 10 is now open.

The switch described to this extent is known from DE 26 44 411 C2 and DE 198 27 113 C2. If the temperature now decreases again, the switch known from DE 26 44 411 C2 would again snap back into the closed state shown in FIG. 1.

In order to prevent this undesired renewed making, a schematically indicated self-holding resistor 37 is provided on the inner side of the upper part 15, which self-holding resistor is connected electrically in series between the two stationary contacts 31, 32 and, when the switch 10 is open, conducts a residual current, by means of which it is heated to such an extent that the bimetallic snap-action disc 22 is kept at a temperature above its return temperature.

While the contact plate 24 in the embodiment shown is moved by a temperature-dependent switching mechanism 11 comprising a circular spring snap-action disc 21 and a circular bimetallic snap-action disc 22, it is also possible to dispense with the spring snap-action disc and to hold and move the contact plate 24 merely by means of a bimetallic snap-action disc 22. In addition, instead of a circular contact plate 24, an elongate contact bridge can also be used.

While in the embodiment shown the contact plate 24 is held centrally by the bimetallic snap-action disc 22 and the spring snap-action disc 21, it is also possible to use an elongate bimetallic spring which is clamped in at one end, which elongate bimetallic spring bears a contact bridge at its free end, as is known, for example, from DE 10 2004 036 117 A1.

Figure 1:
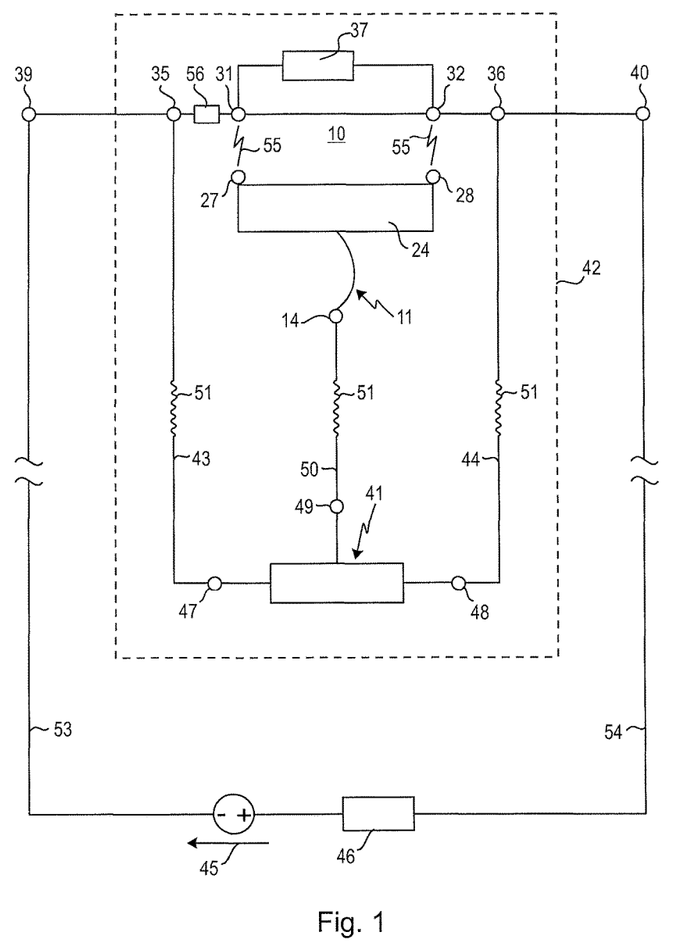
FIG. 1 shows a schematic illustration of a first embodiment of the novel thermal protection circuit, in which the switch shown in FIG. 2 is used.

In FIG. 1, between two connection terminals 39, 40, the temperature-dependent switch 10 shown in FIG. 2 is interconnected with an electronic semiconductor switch 41 to form a thermal protection circuit 42 bordered by dashed lines, which thermal protection circuit is connected via the connection terminals 39, 40 to a series circuit comprising an DC voltage source 45 and an electrical device 46 to be protected.

Switch 10 is indicated merely schematically in FIG. 1; the schematically indicated design features are provided with the reference symbols as in FIG. 1. Two connecting lines 43, 44 are connected to the two external terminals 35, 36 of the switch 10, which are in turn connected to the stationary contacts 31, 32, which are short-circuited via the contact plate 24 in the switching position shown in FIG. 2, which contact plate is borne by the switching mechanism 11. The external terminals 35, 36 are connected to the connection terminals 39 and 40, respectively, of the thermal protection circuit 42.

The contact plate 24 is electrically connected to the lower part 14 via the switching mechanism 11, i.e. in this case the spring snap-action disc 21, which lower part is characterized by a circle as a terminal in FIG. 1. The semiconductor switch 41 has two current terminals 47, 48, which are each connected to one of the connecting lines 43, 44. In addition, the semiconductor switch 41 has a control input 49, which is connected to the lower part 14 via a control line 50.

Rippled sections 51 in connecting lines 43, 44 and control line 50 indicate that the semiconductor switch 41 can be connected to the connecting lines 43, 44 at any suitable point. The rippled sections 51 can be embodied as plugs, such that the semiconductor switch 41 can be connected to the device 46 retrospectively and can be replaced at any time.

With existing or permanent wiring of the switch 10 to the DC voltage source 45 and the device 46, the semiconductor switch 41 can therefore be connected as desired to the connecting lines 43, 44 or to external lines 53, 54, which lines do not need to be newly laid for this purpose, but merely need to be stripped of insulation at the appropriate point for the connection to the current terminals 47, 48. Only the control line 50 still needs to be laid to the switch 10 and connected there externally to the lower part 14, as a result of which the electrical connection to the switching mechanism 11 and, via said switching mechanism, to the contact plate 24 is produced.

In this way, an existing switch 10 can be connected to the semiconductor switch 41 which, in the manner outlined at the outset, ensures that the arcs forming on opening of the switch 10 between the counter contacts 27, 28 and the stationary contacts 31, 32 are quenched very quickly, with these arcs being denoted schematically in FIG. 1 by 55. FIG. 1 shows the switch 10 in a switching state in which the contact plate 24 is just moving away from the stationary contacts 31, 32.

When the temperature-dependent switch 10 opens, as shown in FIG. 1, the arcs 55 begin to develop when the contact plate 24 lifts off from the stationary contacts 31, 32, which arcs quickly build up an arc voltage. As a result, a sufficiently high and long-lasting control current for the semiconductor switch 41 is produced, which current flows via the contact plate 24, the spring snap-action disc 21 and the lower part 14 into the control line 50 and there into the control input 49. After de-charging of the residual capacity of the semiconductor switch, what takes only some microseconds, the control current is reduced to the residual current, which is in the microampere region, and the semiconductor switch 41 closes.

As soon as the semiconductor switch 41 closes, said semiconductor switch takes up the load current and the temperature-dependent switch 10 is de-energized, with the result that the arcs 55 are quenched, whereupon the semiconductor switch 41 opens again.

The self-holding resistor 37 now takes up a residual current, which keeps the switch 10 open even after the device 46 has cooled down.

FIG. 1 also shows a heating resistor 56, which is connected in series between the stationary contact 31 and the external terminal 35, i.e. one of the connection terminals of the thermal protection circuit 42.

Neither the self-holding resistor 37 nor the heating resistor 56 impairs the interaction between the switch 10 and the semiconductor switch 41 which is used in accordance with the invention.

While the lower part 14 is electrically conductive in the case of the switch 10 shown in FIG. 2, it can also be manufactured from insulating material. In order that the switching mechanism 11 can nevertheless be connected to the control input 49, an additional electrode is required which produces the connection to the switching mechanism 11. This can be a lug passed out towards the side at shoulder 18 in the case of the design shown in FIG. 1.

When the contact plate 24 is arranged on a free end of a bimetallic spring, this can be an electrode which is connected to the other, clamped-in end of the bimetallic spring.

The two external terminals 35 and 36 can also simultaneously act as connection terminals 39 and 40, respectively. The external lines 53, 54 can also be formed by the connecting lines 43 and 44, respectively, which, for this purpose, are routed on to the device 46 and the DC voltage source 45.

Instead of a switch 10 with two simultaneously opening contact pairs 27/31 and 28/32, two single-pole temperature-dependent switches can also be used, as are described, for example, in DE 21 21 802 A and other intellectual property rights owned by the present applicant.

Figure 3:
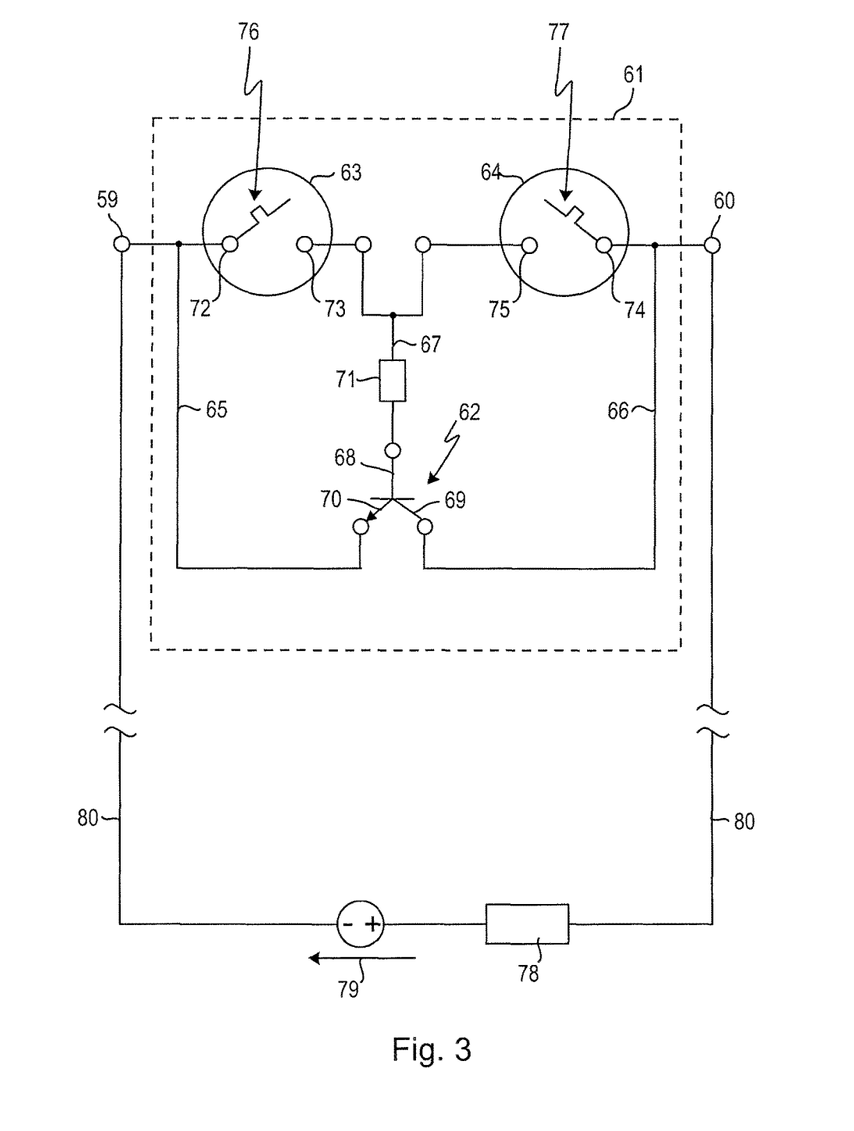
FIG. 3 shows a second embodiment of the thermal protection circuit shown in FIG. 1, in which two single-pole temperature-dependent switches are used, of which one is shown in FIG. 4.

FIG. 3 shows—between two connection terminals 59, 60—a thermal protection circuit 61, in which circuit a semiconductor switch in the form of an n-channel bipolar transistor 62 is connected to two single-pole temperature-dependent switches 63, 64 via two connecting lines 65, 66 and a control line 67. The switches 63 and 64 are interconnected as a so-called twin.

The transistor 62 has as control input a base 68 as well as a collector 69 and an emitter 70 that serve as current terminals. Base 68 is connected to control line 67 via a series resistor 71.

Each switch 63, 64 has two external terminals 72, 73 and 73, 74, respectively. The external terminals 73 and 75 are connected to one another and via the control line 67 to series resistor 71 and via this to the base 68. The external terminals 72 and 74 are connected to the connection terminals 59 and 60, respectively, and to the connecting lines 65 and 66, respectively.

Each switch 63, 64 also has a switching mechanism 76 and 77, respectively, which is connected to the transistor 62 via the external terminals 73 and 75, respectively. When the switching mechanisms 76, 77 open as a result of overheating of a device 78 connected to the connection terminals 59, 60, a comparable function results as in the case of the thermal protection circuit 41 shown in FIG. 2. External lines 80 are used for connecting the thermal protection circuit 61, the device 78 and the DC voltage source 79 in series with one another.

Owing to the protective function of the transistor 62 used according to the invention, temperature-dependent switches 63, 64 with a very simple design can be used for the thermal protection circuit 61 shown in FIG. 3, which switches are actually only designed for low switching powers. Since the transistor 62 ensures, in the described way, that arcs which arise are quenched again very quickly, however, these switches can be used for relatively high switching powers and in addition also have a relatively long life.

The two external terminals 72 and 74 can also simultaneously act as connection terminals 59 and 60, respectively. The external lines 80 can also be formed by the connecting lines 65 and 66, which, for this purpose, are passed on to the device 78 and the DC voltage source 79.

Figure 4:
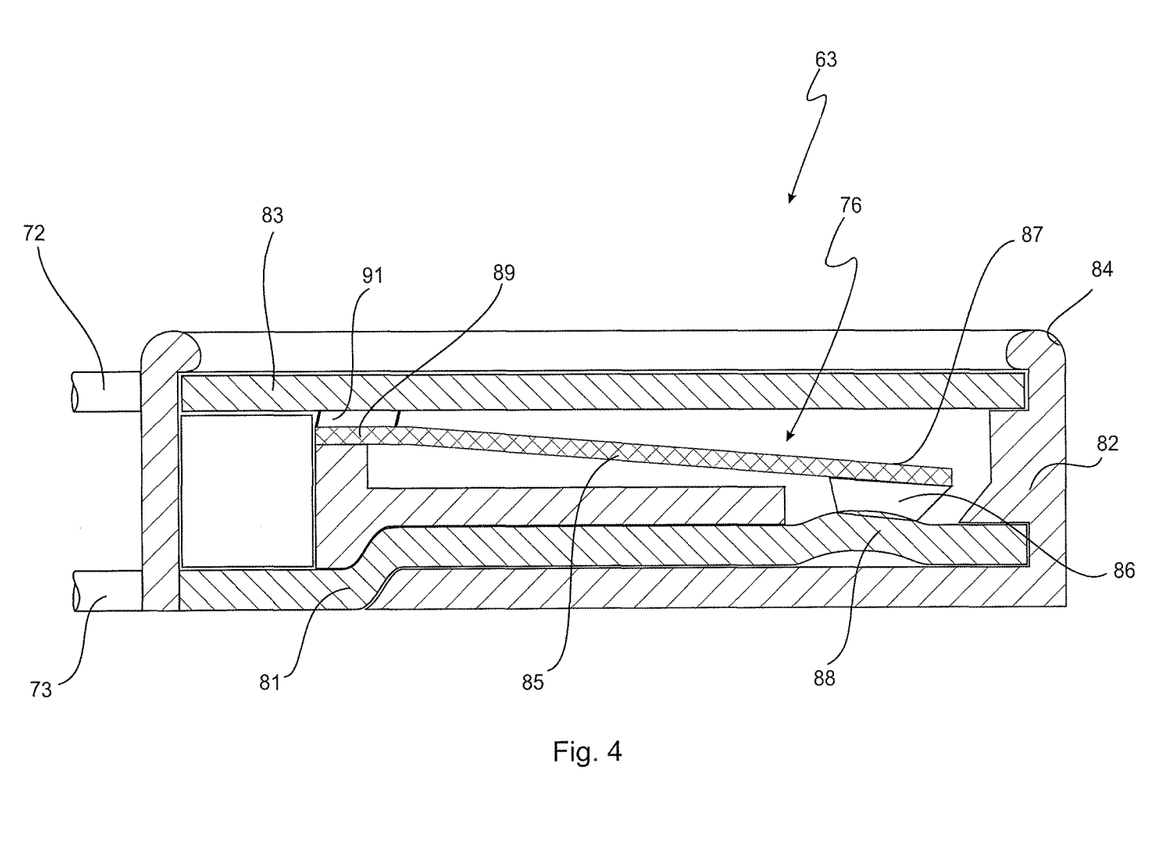
FIG. 4 shows a single-pole temperature-dependent switch, as is used in the thermal protection circuit shown in FIG. 3.

FIG. 4 shows, by way of example, a simple, single-pole temperature-dependent switch 63, which has a base electrode 81, which is encapsulated by injection molding with a supporting part 82 consisting of plastic, on which a cover electrode 83 rests, which is held via a hot-compressed rim 84 of the supporting part 82.

The cover electrode 83 and the base electrode 81 are provided with the external terminals 72 and 73, respectively.

The temperature-dependent switching mechanism 76, which in the present case comprises a spring tongue 85 consisting of a bimetallic material, is arranged in the interior of the housing of the switch 63 thus formed.

The spring tongue 85 bears a moveable contact part 86 on its free end 87. The moveable contact part 86 interacts with a forward curvature 88 of the base electrode 81. This forward curvature 88 acts as stationary contact part, with the result that the contact part 86 and the forward curvature form a switching contact.

At its rear end 89, the spring tongue 85 is connected to the cover electrode 83 via an intermediate part 91.

When the temperature in the interior of the switch 63 increases beyond the response temperature of the spring tongue 85, said spring tongue moves its free end 87 upwards in FIG. 4, with the result that the moveable contact part 86 is lifted off from the forward curvature 88. The arc thus produced is quenched by the transistor 62 in the manner described.

Figure 5:
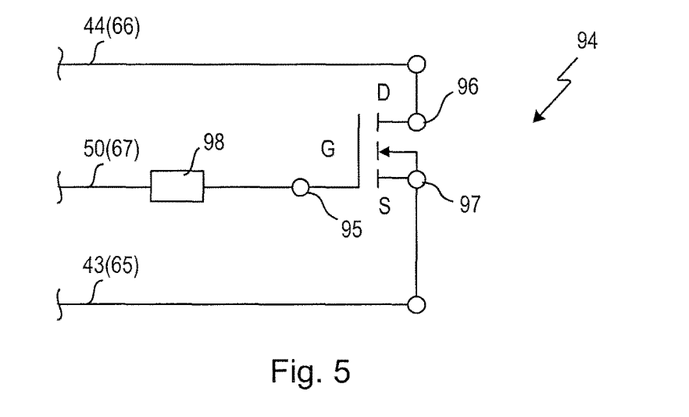
FIG. 5 shows an embodiment for the wiring of the semiconductor switch shown in FIG. 1 or FIG. 3.

In FIG. 5 as semiconductor switch 41 a self-locking n-channel MOS-FET 94 is shown, which comprises a gate electrode 95 as control input as well as a drain electrode 96 and a source electrode 97 as current terminals. MOS-FET 94 can be inserted as semiconductor switch 41 into thermal protection circuit 42 from FIG. 1 or instead of transistor 62 into thermal protection circuit 61 from FIG. 3.

To this end, gate electrode 95 is connected via a series resistor 98 to control line 50 and 67, respectively, while drain electrode 96 and source electrode 97 are connected to connecting lines 43 and 44 or 66 and 65, respectively.

Upon opening of temperature-dependent switch 10, 63, 64 half of the arc voltage drops over the gate-source junction, this switching MOS-FET 94 through. MOS-FET 94 takes over the load current and the arcs are quenched, whereupon MOS-FET 94 opens again.

In this circuit, attention has to be paid to correct polarity of MOS-FET 94 with respect to DC supply voltage 45, 79. In case, devices 46, 78 comprise an inductive or capacitive load, the MOS-FET can also replace the inverse diode.

The resistance values of series resistors 71, 98 limit the switching speed of transistors 62, 94.

Figure 6:
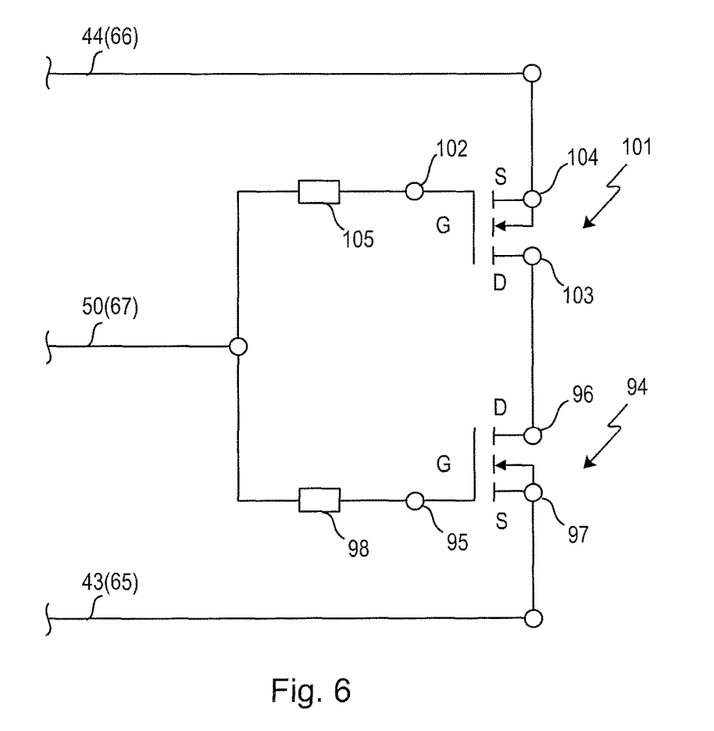
FIG. 6 shows an embodiment for the wiring of two semiconductor switches in the thermal protection circuit shown in FIG. 1 or FIG. 3.

FIG. 6 shows in a depiction as in FIG. 5 a circuit wherein a second MOS-FET 101 having gate electrode 102, drain electrode 103 and source electrode 104 is used, in order that the thermal protection circuit is provided with arc quenching for both current directions.

MOS-FETs 94, 101 are connected in anti-series between said two connecting lines 44 (66) and 43 (67) such that their drain electrodes 96 and 103 are connected to each other and their source electrodes 104 and 97 are connected to connecting lines 44 (66) and 43 (67), respectively. Gate electrodes 95 and 102 are connected via series resistors 98 and 105 to each other and to control line 50 (67).

With the polarity of DC supply voltage 45 and 79, respectively, as shown in FIG. 1 and FIG. 3, as well as well with opposite polarity, arcs forming on opening of temperature-dependent switches 10, 63, 64 effect that initially one of said two MOS-FETs 94 and 101 switches through. This leads to the fact that via the MOS-FET 94, 101 switched through, and via the other MOS-FET 101, 94 a current flows, namely through the latter's substrate electrode that passes current through opposite to the drain-source current direction. This again leads to quenching of the arcs and in the sequence to the re-opening of the MOS-FET 94, 101 previously switched through.

When using the circuit according to FIG. 6, thermal protection circuit 42, 61 is consequently protected against reverse polarity, while when using the circuit according to FIG. 5, attention has to be paid to the correct polarity of thermal protection circuit 42, 61 in the circuit with device 46, 78 and DC supply voltage 45, 79.

Figure 7:
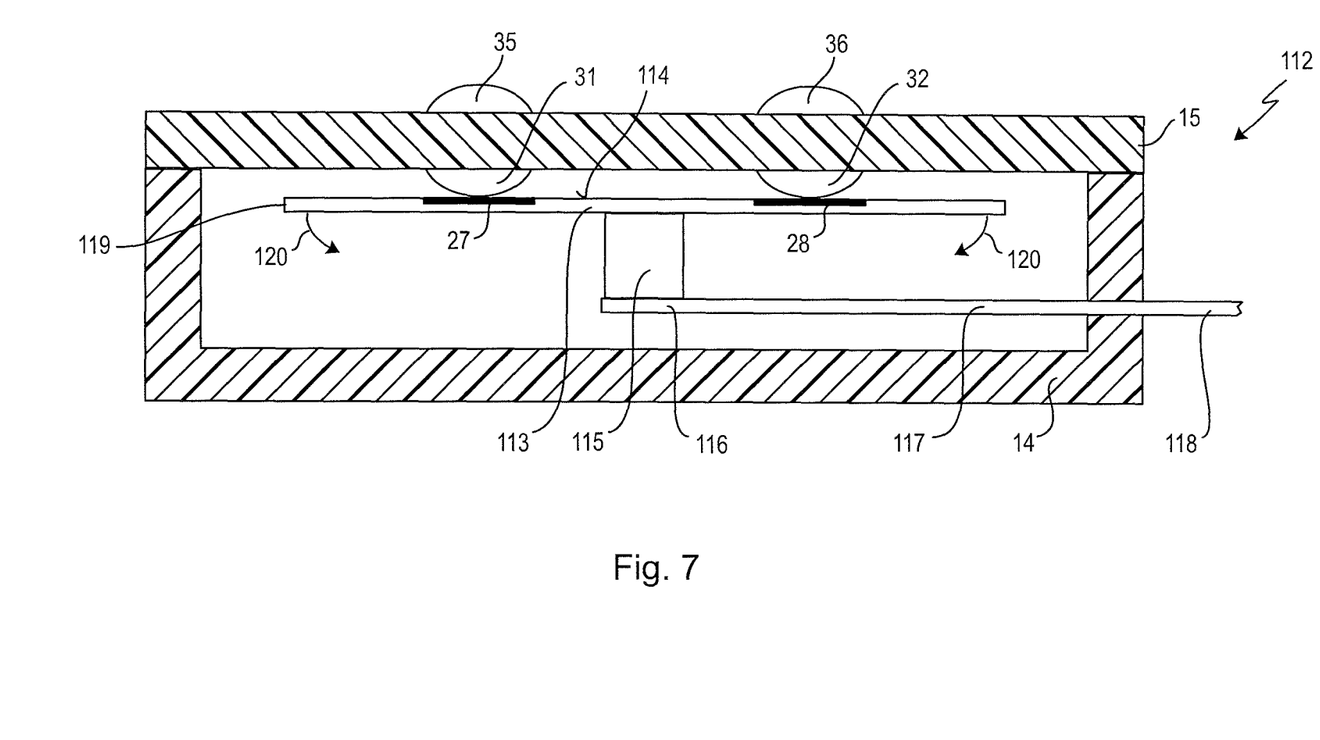
FIG. 7 shows a schematic longitudinal section (not true to scale) through a second embodiment of a temperature-dependent switch, as can be used in the novel thermal protection circuit shown in FIG. 2.

FIG. 7 shows in a depiction as in FIG. 2 a further temperature-dependent switch 112, which can be used in the thermal protection circuit 42 in FIG. 1. Switch 112 comprises like switch 10 an upper part 15 at which are internally provided said two stationary contacts 31, 32, which are connected to said two external terminals 35, 36.

The temperature-dependent switching mechanism 11 comprises a bimetallic snap-action disk 113 having on its upper side 114 embodied said two counter contacts 27, 28, which in the simplest case are provided by the upper side 114 itself, because bimetallic snap-action disc 113 is itself electrically conductive. The bimetallic snap-action disc 113 as a spring part here takes over also the task of the contact plate 24, and is therefore also the current transfer element.

The bimetallic snap-action disc 113 is centrically connected to an inner end 116 of an electrically conductive support electrode 117 by an electrically conductive bolt 115, the outer end 118 of the support electrode being connected to the control line in FIG. 1. In this embodiment, the lower part 14 as well as the upper part 15 is produced from insulating material.

If to the contrary the lower part 14 is electrically conductive, bolt 116 can be directly connected below at the inner bottom of lower part 14, such that lower part 14 again can be used for the permanent electrically connection to control input 49.

When bimetallic snap-action disc 113 heats up beyond its response temperature, its rim 119 moves downwards in FIG. 7, as is indicated by arrow 120. During this movement, counter contacts 27, 28 are moved away from stationary contacts 31, 32, such that arcs form which, however, are quickly quenched in the manner described above, by semiconductor switch 41.

Therefore, what is claimed is:

1. A thermal protection circuit comprising first and second electrical connection terminals for an electrical device to be protected from overheating, at least one temperature-dependent switch, and at least one electronic semiconductor switch for DC voltage;

wherein said temperature-dependent switch comprises a temperature-dependent switching mechanism, a first stationary contact connected to the first connection terminal, a second stationary contact connected to the second connection terminal, and two counter contacts, which counter contacts are electrically connected to one another, each one of the two counter contacts being in temperature-dependent bearing contact with each one of the first and second stationary contacts, thereby connecting said first and second stationary contacts electrically to one another, and wherein said semiconductor switch for DC voltage comprises two current terminals and a control input, wherein each of the two current terminals is connected to one of the connection terminals, and the control input is electrically connected, preferably via a series resistor, to the counter contacts via the switching mechanism at least when the temperature-dependent switch is closed, and wherein the switching mechanism comprises a current transfer element at which said two electrically interconnected counter contacts are arranged.

2. A thermal protection circuit comprising first and second electrical connection terminals for an electrical device to be protected from overheating, at least one temperature-dependent switch, and two electronic semiconductor switches for DC voltages;

wherein said temperature-dependent switch comprises a temperature-dependent switching mechanism, a first stationary contact connected to the first connection terminal, a second stationary contact connected to the second connection terminal, and two counter contacts, which counter contacts are electrically connected to one another, each one of the two counter contacts being in temperature-dependent bearing contact with each one of the first and second stationary contacts, thereby connecting said first and second stationary contacts electrically to one another, and wherein each of said two semiconductor switches for DC voltages comprises two current terminals and a control input, the control input of each of said two semiconductor switches being each electrically connected via the switching mechanism and via a series resistor to the two counter contacts, at least when the temperature-dependent switch is closed, wherein each of said two semiconductor switches for DC voltages comprises a first and a second current terminal, the first current terminal of a first of the two semiconductor switches being connected to the first current terminal of a second of the two semiconductor switches, and the second current terminal of the first semiconductor switch and the second current terminal of the second semiconductor switch being connected with the first and the second connection terminals, respectively.

3. The thermal protection circuit of claim 2, wherein each semiconductor switch comprises a transistor selected from the group consisting of bipolar transistors, field-effect transistors (FET) and metal-oxide semiconductor field-effect transistors (MOS-FET).

4. The thermal protection circuit of claim 2, wherein the switching mechanism comprises a current transfer element at which said two electrically interconnected counter contacts are arranged.

5. The thermal protection circuit of claim 2, wherein the temperature-dependent switching mechanism comprises a spring part, which bears the current transfer element and is electrically conductively connected thereto and is electrically connected to the two control inputs at least when the temperature-dependent switch is closed.

6. The thermal protection circuit of claim 5, wherein the switch comprises a housing that accommodates the switching mechanism and has a lower part and an upper part, the stationary contacts being arranged on an inner side of said upper part.

7. The thermal protection circuit of claim 5, wherein the spring part comprises a bimetallic snap-action disc, which is supported on the lower part at least when the temperature-dependent switch is closed.

8. The thermal protection circuit of claim 5, wherein the spring part comprises a spring snap-action disc, which is supported on the lower part at least when the temperature-dependent switch is closed, wherein a bimetallic snap-action disc is provided which lifts off the current transfer element from the stationary contacts when said bimetallic snap-action disc is at a temperature above its switching temperature.

9. The thermal protection circuit of claim 7, wherein said lower part is electrically conductive.

10. The thermal protection circuit of claim 9, wherein the spring part is permanently electrically connected to the lower part.

11. The thermal protection circuit of claim 1, wherein a self-holding resistor is connected between the first and second stationary contacts.

12. The thermal protection circuit of claim 2, wherein a heating resistor is connected between one of the stationary contacts and the associated connection terminal.

13. The thermal protection circuit of claim 4, wherein the current transfer element comprises an electrically conductive contact plate, on which the two counter contacts are arranged, which counter contacts are electrically conductively connected to one another via the contact plate, wherein the contact plate is electrically conductively connected to the switching mechanism.

14. The thermal protection circuit of claim 4, wherein the current transfer element comprises an electrically conductive spring part, on which the two counter contacts are arranged, which counter contacts are electrically conductively connected to one another via the spring part.

15. The thermal protection circuit of claim 14, wherein said spring part is a bimetallic snap-action disc.

16. The thermal protection circuit of claim 15, wherein said spring part is permanently connected to said first and second control input.

17. A thermal protection circuit comprising a first and a second electrical connection terminal for an electrical device to be protected from overheating, at least one temperature-dependent switch, and two electronic semiconductor switches for DC voltage, wherein said temperature-dependent switch comprises a temperature-dependent switching mechanism, a first stationary contact connected to the first connection terminal, a second stationary contact connected to the second connection terminal, and two counter contacts, which counter contacts are electrically connected to one another, each one of the two counter contacts being in temperature-dependent bearing contact with each one of the first and second stationary contacts, thereby connecting said first and second stationary contacts electrically to one another, and wherein each of said two semiconductor switches comprises two current terminals and a control input, the control input of each of said two semiconductor switches being each electrically connected via the switching mechanism to the two counter contacts, at least when the temperature-dependent switch is closed, wherein each of said two semiconductor switches for DC voltage comprises a first and a second current terminal, the first current terminal of a first of the two semiconductor switches being connected to the first current terminal of a second of the two semiconductor switches, the second current terminal of the first semiconductor switch and the second current terminal of the second semiconductor switch being connected with the first and the second connection terminal, respectively.

18. The thermal protection circuit of claim 17, wherein the control input of each of said two semiconductor switches is electrically connected to the two counter contacts via the switching mechanism and via a series resistor.

19. An electrical device comprising the thermal protection circuit of claim 17.

* * * * *